United States Patent [19]

Harsnett

[11] 4,063,251

[45] Dec. 13, 1977

[54] LOCKER SECURITY SYSTEM

[76] Inventor: Albert G. Harsnett, 31-06 95th St., E. Elmhurst, N.Y. 11369

[21] Appl. No.: 726,683

[22] Filed: Sept. 27, 1976

[51] Int. Cl.[2] ........................ G01D 9/00; G03B 29/00

[52] U.S. Cl. .................................... 346/33 R; 354/75; 340/221

[58] Field of Search ......................... 346/33 R, 34, 41; 354/75, 81, 109; 340/221

[56] References Cited

U.S. PATENT DOCUMENTS

| | | | |
|---|---|---|---|
| 2,349,355 | 5/1944 | Kepler | 354/75 X |
| 3,531,794 | 9/1970 | Goerner | 340/221 X |
| 3,672,269 | 6/1972 | Tabankin | 354/75 |
| 3,780,378 | 12/1973 | Simonson | 354/109 X |

*Primary Examiner*—George H. Miller, Jr.

*Attorney, Agent, or Firm*—Allen D. Brufsky

[57] ABSTRACT

A normally open push button switch is mounted in each storage locker of a bank or lockers in a transportation terminal and connected in parallel to at least one camera for recording a visual image of a person opening the door of any one of the lockers. Upon opening the door, the switch closes to activate the camera.

5 Claims, 3 Drawing Figures

LOCKER SECURITY SYSTEM

BACKGROUND OF THE INVENTION

This invention relates to a system for photographing and/or maintaining a number of airport, train station or bus terminal lockers under surveillance when opened to obtain a visual record of the person using the locker.

Lockers in public transportation facilities have recently been used by terrorists as a depository for explosive devices, causing much death and injury to innocent bystanders. Accordingly, this invention provides a security system which is activated upon opening of any locker in a bank of lockers provided in a public transportation facility to photograph and obtain a visual record of the person using the locker.

SUMMARY OF THE INVENTION

In accordance with the invention, a normally open push button switch is mounted adjacent the door in each locker of a row or bank of lockers and wired in parallel. When the door of any locker is opened, the push button is released, closing an electric circuit to activate a near and remote still, movie or television camera having a video tape recorder which scans the locker bank recording a visual image of the user. When the locker door is closed, the camera is deactivated. Should the near camera be destroyed in an explosion, the remote camera will still retain the requisite image of the user.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
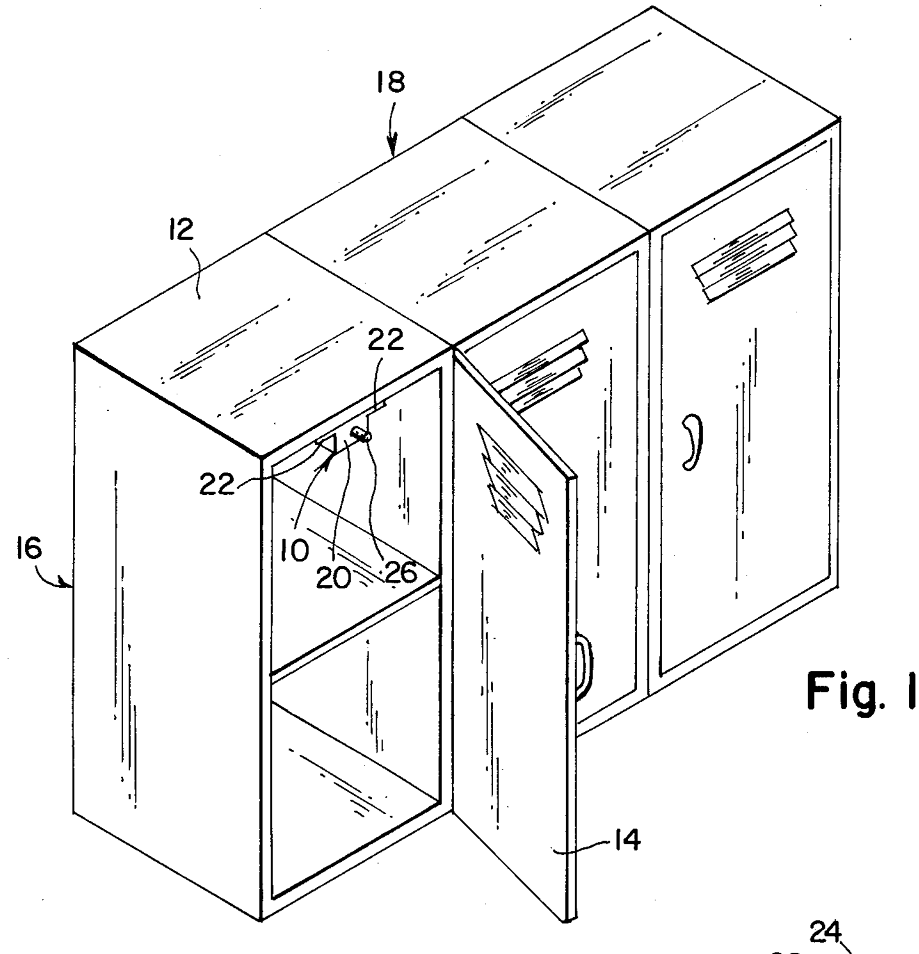
FIG. 1 is a perspective view of a row or bank of lockers provided with the security system of the present invention.
Figure 3:
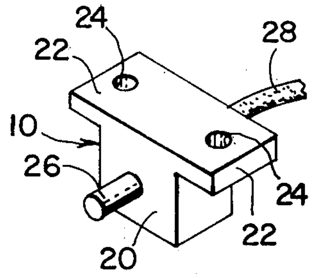
FIG. 3 is a perspective view of one of the push-button switches used to activate the security system of the invention.

Referring now in detail to the drawing, wherein like numerals indicate like elements throughout the several views, the locker security system of the present invention includes a normally open, conventional push button switch 10 mounted on the roof 12 immediately in front of the front door 14 of each locker 16 of a row or bank of lockers 18.

Figure 2:
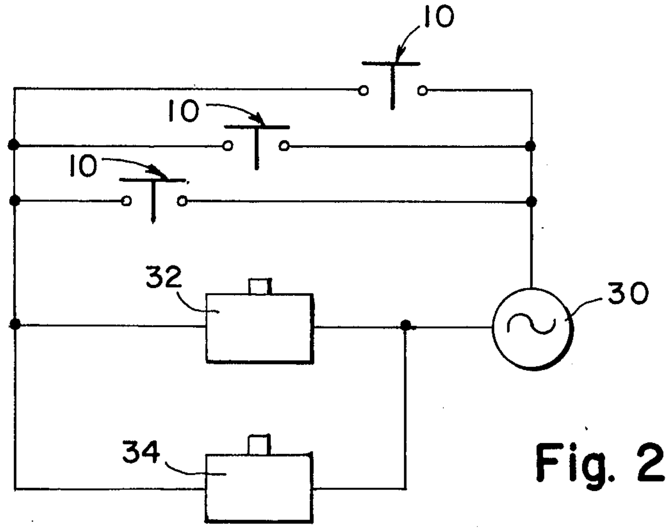
FIG. 2 is an electrical schematic diagram of the circuit of the security system.

Switches 10 includes a housing 20 having a pair of mounting flanges 22 for receiving fasteners through holes 24 in each flange to secure the switch to the roof 12 of each locker 16. A reciprocable push button switch element 26 when depressed opens the switch, but when not depressed, closes the switch. Each of the switches 10 includes electrical connectors 28 for wiring and connecting a switch 10 associated with each locker 16 in parallel to a source of electrical energy 30, as shown in FIG. 2, and to a near and remote still, movie or television camera 32 and 34, respectively, the latter being provided with a video tape recorder.

When locker door 14 of any of the lockers 16 in bank 18 is opened, one of switches 10 will close to activate cameras 32 and 34 to record a visual image of the user of the locker. When the door 14 is closed, the cameras are deactivated. Should the near camera 32 be destroyed in an explosion, the remote camera will still retain the requisite image of the user.

While a specific embodiment of a locker security system has been disclosed in the foregoing description it will be understood that various modifications within the spirit of the invention may occur to those skilled in the art. Therefore, it is intended that no limitations be placed on the invention except as defined by the scope of the appended claims.

I claim:

1. In combination with a storage locker:
   a near and remote camera for recording a visual image of a person opening a door of said storage locker; and
   a normally open switch means mounted on said storage locker and connected in parallel to said cameras for activating the cameras in response to opening of said locker door.

2. The combination of claim 1 including a bank of storage locker, each of said lockers having a normally open switch mean mounted therein connected in electrical parallel to said cameras.

3. The combination of claim 2 including a near and remote camera connected in parallel to each of said switch means.

4. The combination of claim 1, wherein said switch means is a push button switch mounted in said storage locker adjacent said door and having a reciprocable contact element in abutment with said door when said door is closed.

5. The combination of claim 4 wherein said switch means further includes a pair of mounting flanges having holes therethrough.

* * * * *